July 30, 1968
G. M. PFUNDT
3,394,634
INTERNAL RELIEF VALVE FOR HYDRAULICALLY ACTUATED POLE PULLERS
Filed Oct. 21, 1966
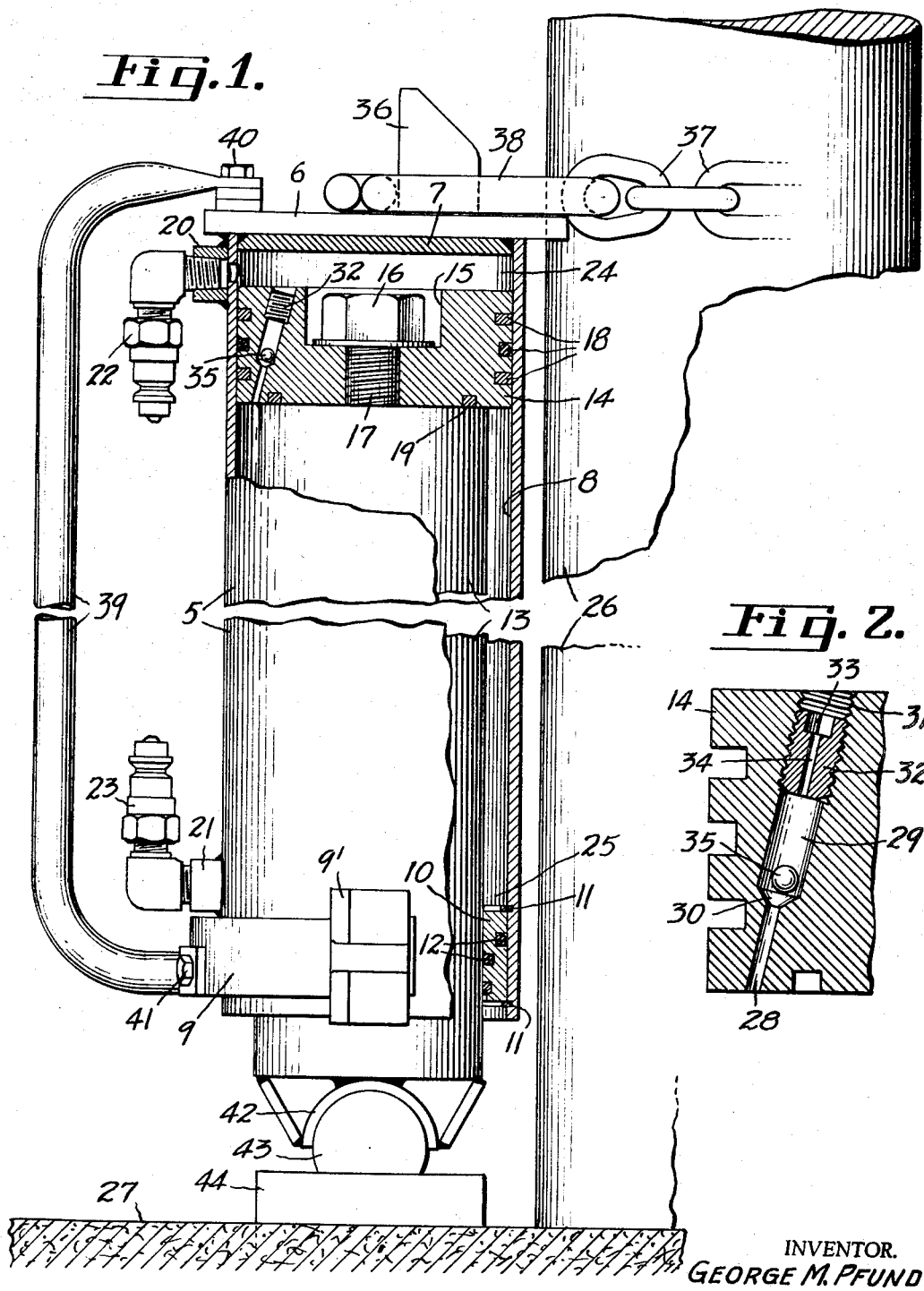
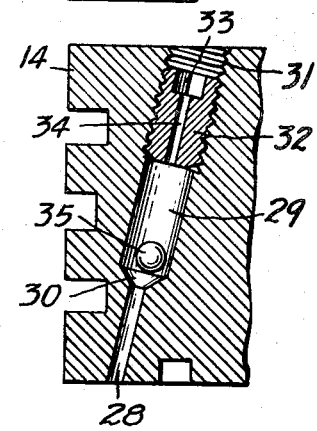
INVENTOR.
GEORGE M. PFUNDT
BY
*Howard E. Thompson*
ATTORNEY United States Patent Office 3,394,634
Patented July 30, 1968

3,394,634
**INTERNAL RELIEF VALVE FOR HYDRAULI-
CALLY ACTUATED POLE PULLERS**
George M. Pfundt, 87 Bustleton Pike,
Churchville, Pa. 18966
Filed Oct. 21, 1966, Ser. No. 588,560
2 Claims. (Cl. 92—181)

ABSTRACT OF THE DISCLOSURE

An internal relief valve mounted in the head of the piston of a hydraulic cylinder device, constituting the power source of a hydraulic lift or pole puller, the valve being exposed to both ends of the piston head and operating to relieve excessive pressure or to maintain a balance in the hydraulic system, thus obviating damage to the device.

---

This invention relates to hydraulically actuated pole pullers employing cylinder and piston units relativelly movable one with respect to the other in the lifting of poles. More particularly, the invention deals with the provision of an internal relief valve incorporated in the head of the piston unit for preventing the build-up to excessive pressures in the hydraulic system and in substantially neutralizing internal pressures of the system. Still more particularly, the invention deals in puller devices of the character defined, wherein one of the units includes means for coupling the same with a pole to be lifted and, wherein, the other unit includes means for pivotal support thereof upon the ground adjacent the pole being pulled.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic view generally illustrating the association of the puller with a pole and the ground, with parts of the construction broken away and with parts shown in section; and FIG. 2 is an enlarged sectional detail of the piston head showing the relief valve assemblage arranged therein.

In illustrating one adaptation and use of my invention, I have shown a pole puller, generally of the type and kind disclosed in United States Patent Number 3,155,372, issued Nov. 3, 1964. In the drawing, the pole puller device comprises an outer cylinder unit 5 having a top plate 6 welded to the free end of the cylinder. The plate 6 includes an inner plate portion 7 which is welded to 6 and fits within the bore 8 of the cylinder 5.

The cylinder 5 comprises a one diameter tube and welded or otherwise fixed to the outer surface of the lower end of the cylinder is a bracket 9. The bore of the other end of the cylinder includes an inner ring 10 held in place by snap rings 11, the ring 10 having suitable packings, as at 12, to seal the ring 10 in the cylinder and on the tubular stem or piston rod 13, the head of which is seen at 14 in the upper portion of the cylinder unit 5. This assemblage will comprise what I term the piston unit.

The upper end of the head 14 has a recess 15 to receive the head 16 of a bolt 17, having a suitable coupling with the upper closed portion of the tubular piston rod 13. This is not shown, but will be apparent to one skilled in the art. On the wall of the head 14 are suitable rings or packings 18 and a packing 19 is arranged between the head 14 and the piston rod assemblage 13.

The upper and lower ends of the cylinder 5 have, at one side thereof, enlarged bearing portions 20 and 21, with which are coupled suitable quick couplings, as at 22 and 23, respectively, with which hydraulic tubular lines from a source of supply will be connected in the intake and discharge of a hydraulic medium into upper and lower chambers 24 and 25 of the cylinder unit in controlling operation of said cylinder unit. It will be understood that, when a hydraulic medium is introduced into the intake chamber 24 with a discharge from the chamber 25, the cylinder unit 5 will be moved upwardly on 13 and 14 to whatever degree is deemed necessary within end limits of the cylinder unit 5 to raise a pole 26. The pole 26 is only partially shown in the drawing. By way of illustration, at 27 is diagrammatically illustrated part of the ground into which the pole 26 is embedded and from which the pole is to be withdrawn by a series of operations of the puller device. In the reverse action of the device or in the downward movement of the cylinder 5, the hydraulic medium will be exhausted from the chamber 25 and the cylinder unit will be moved downwardly.

With lift devices of the type and kind under consideration, it has been found necessary to incorporate an external pressure relief valve in controlling the discharge through the quick coupling 23 in order to relieve the build-up of pressure between the cylinder 5 and the tubular rod 13, resulting in destruction or at least distortion of these members of the device. Installation of the relief valves, as noted above, avoided this destruction but, in such external use of a relief valve, the oil of the hydraulic system is spilled, which results in a loss, as well as undesirable conditions.

To obviate the foregoing objections and to maintain a neutralized internal pressure, I have provided means in the form of what I term an internal relief valve for automatically caring for maintaining what might be termed a substantial balance in the hydraulic system and obviating any damage to the cylinder and piston units of the lift device.

With my construction, it will appear that, with my improved lift device, it will be apparent that, in the downward movement of the piston unit, any build-up of pressure will be compensated for by an internal relief valve structure constituting part of the head 14, thus forming what can be termed a valve structure. This valve, note FIG. 2, comprises a small diameter bore 28 opening into the chamber 25, as seen in FIG. 1. The bore 28 opens into a larger diameter bore 29 in a bevelled seat 30. The outer end of the bore 29 is threaded, as seen at 31, to receive a plug 32. The plug 32 has, as its outer end, a wrench socket 33 and the inner portion of the plug includes a small diameter relief port 34. Arranged in the bore 30 is a ball valve 35. The valve 35 normally rest on the bevelled seat 30 in the upward movement of the cylinder unit 5. However, in the event of a build-up of pressure in the chamber 25 at any time, the hydraulic medium will unseat the ball valve 35, allowing the medium to pass into the chamber 24, thus maintaining a neutralized or balanced condition in the hydraulic system.

The top plate 6 is of a contour to receive part of the pole 26, as indicated in FIG. 1. On the upper surface of the plate 6, at one side thereof, is what is generally referred to as a chain hook 36, with which a chain, diagrammatically seen, in part, at 37 is adapted to be coupled. The chain 37 has a ring end 38 adapted to engage 36. The remainder of the chain which passes around the pole 26 has been omitted, but it will be apparent that this end of the chain is coupled with a hook 36 in securely coupling the pole with the puller device, or the cylinder unit thereof, as shown.

Secured to the plate 6 is a long handle member 39, the upper end portion of which is screwed or bolted to the plate 6, as seen at 40. The other end of the handle member 39 is attached to the bracket 9, as indicated at 41.

The bracket 9 includes, at its ends, hooks or other chain engaging members, one of which is seen at 9', to facilitate positioning of the chain 37 at the lower portion of the cylinder unit to engage what might be termed a stump of pole, in other words, a pole which projects only slightly above the ground level.

Welded to a lower closed end of the piston rod 13 is a circular saddle 42, which is adapted to be movably supported on a partially rounded cylinder 43 welded or otherwise secured to an anchor bottom plate 44. This pivotal support will serve to maintain the puller device substantially parallel with the axis of the pole.

By providing the internal relief valve, it will also be apparent that, in the operation of the device, the neutralizing of the pressure of the hydraulic system will serve to check the movement of the units into the position shown in the drawing. This further avoids any danger of the piston head of the piston unit striking the upper end of the cylinder unit which, without the relief of the build-up pressure, could not be obviated. The entire pole puller device is of simple and economical construction and, by virtue of use of the internal relief valve, efficiency in operation and long life use will be maintained.

Having fully described my invention, what I claim as new and desire to secure by Letters Patent is:

1. A pole puller device employing cylinder and piston units, having means on the end portion of the cylinder unit for clamping said cylinder unit to a pole to be pulled and means on the opposed end of the piston unit for pivotal support of said piston unit on the ground adjacent to the pole to be pulled, further said piston unit having a head operating in a bore of the cylinder unit and dividing said bore into intake and discharge chambers, and means communicating with said intake and discharge chambers at ends of the cylinder unit in controlling operation of the device, a relief valve structure in said head, said structure comprising interengaging small and large diameter bores, a seat between said large and small diameter bores, the large diameter bore opening into the intake chamber, the small diameter bore opening into the discharge chamber, a sleeve-like plug mounted in said large diameter bore, a ball valve mounted in the large diameter bore between said plug and seat, and said ball valve controlling the balance of hydraulic pressure between said intake and discharge chambers in the event of development of excessive pressure in said discharge chamber.

2. A pole puller device having hydraulically operated cylinder and piston units where said piston unit includes a head operating in a bore of the cylinder unit and dividing said bore into intake and discharge chambers, said device having means communicating with said intake and discharge chambers at ends of the cylinder unit to control movement of the units one with respect to the other in delivery of a hydraulic medium to said last named means, a relief valve structure constituting part of said piston head and communicating with both of said chambers in controlling the balance of hydraulic pressure between said intake and discharge chambers in the event of development of excessive pressure in said discharge chamber and comprising a small diameter bore opening into one of said chambers, a large diameter bore, a valve seat between said bores, a ball valve arranged in the large diameter bore and operatively engaging said seat, a sleeve-like plug in the large diameter bore retaining said ball valve against displacement, and said plug having a bore extending therethrough opening into the other of said chambers.

References Cited

UNITED STATES PATENTS

| | | | |
|---|---|---|---|
| 1,299,668 | 4/1919 | Blomquist | 91—422 X |
| 2,452,369 | 10/1948 | Gravenhorst et al. | 91—422 X |
| 2,807,081 | 9/1957 | Black | 91—422 X |
| 2,895,454 | 7/1959 | Tebb et al. | 91—422 X |
| 3,155,372 | 11/1964 | Brown | 254—30 |
| 3,316,817 | 5/1967 | Ellis | 92—422 XR |

MARTIN P. SCHWADRON, *Primary Examiner.*

G. N. BAUM, *Assistant Examiner.*